US008725904B2

(12) United States Patent  
Hilland et al.

(10) Patent No.: US 8,725,904 B2  
(45) Date of Patent: May 13, 2014

(54) MANAGEMENT PROCESSORS, METHODS AND ARTICLES OF MANUFACTURE

(75) Inventors: Jeffrey R. Hilland, Lago Vista, TX (US); Dwight L. Barron, Houston, TX (US); Vanish Talwar, Campbell, CA (US); Parthasarathy Ranganathan, San Jose, CA (US); Luis E. Luciani, Jr., Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 174 days.

(21) Appl. No.: 13/212,727

(22) Filed: Aug. 18, 2011

(65) Prior Publication Data

US 2013/0046904 A1 Feb. 21, 2013

(51) Int. Cl.  
*G06F 15/16* (2006.01)

(52) U.S. Cl.  
USPC ............ 709/250; 719/319; 709/223; 709/230

(58) Field of Classification Search  
CPC ...... H04N 21/443; H04L 67/36; H04L 63/10; H04L 29/06; H04L 41/046; H04L 12/2455; H04L 67/00  
USPC ......................................... 709/250, 223, 230  
See application file for complete search history.

(56) References Cited

U.S. PATENT DOCUMENTS

| 6,654,816 | B1 * | 11/2003 | Zaudtke et al. ................... 710/1 |
| 6,665,731 | B1 * | 12/2003 | Kumar et al. ................. 709/246 |
| 7,398,401 | B2 * | 7/2008 | Goud et al. .................... 713/300 |
| 8,301,769 | B2 * | 10/2012 | Hopen et al. ................... 709/225 |
| 8,566,847 | B2 * | 10/2013 | Ling et al. ..................... 719/328 |
| 2001/0020251 | A1 | 9/2001 | Sheikh et al. |
| 2003/0131136 | A1 * | 7/2003 | Emerson et al. .............. 709/250 |
| 2008/0046546 | A1 | 2/2008 | Parmar et al. |
| 2009/0193118 | A1 | 7/2009 | Cox et al. |
| 2010/0186094 | A1 | 7/2010 | Shannon et al. |
| 2012/0017121 | A1 * | 1/2012 | Carlson et al. .................. 714/43 |

FOREIGN PATENT DOCUMENTS

WO 2009151445 12/2009

OTHER PUBLICATIONS

Hewlett-Packard Development Company, L.P., HP Integrated Lights-Out User Guide, for HP Integrated Lights-Out firmware1.91, Third Edition, May 2007, 205 pages.

* cited by examiner

*Primary Examiner* — Patrice Winder  
*Assistant Examiner* — Eyob Hagos (57) ABSTRACT

Example management processors, methods and articles of manufacture are disclosed. A disclosed example management processor includes a network card interface to communicatively couple the management processor to an operating environment, and a request processor to forward a received external management request to the operating environment via the network card interface, and to combine response information received from the operating environment with response information generated at the management processor.

15 Claims, 3 Drawing Sheets

MANAGEMENT PROCESSORS, METHODS AND ARTICLES OF MANUFACTURE

BACKGROUND

Representing and monitoring components in a computer for the purposes of systems management is traditionally achieved through isolated silos and/or domains of visibility. In such approaches, each domain manages the device(s) to which it has an interface. In some instances, management processors are used to enable remote management and/or monitoring of computers.

DETAILED DESCRIPTION

Prior art management processors manage device(s) to which they have an interface. However, prior art management processors that do not have an interface to a system component, cannot manage that component. Thus, for example, a prior art management processor interfaced to a peripheral component interconnect (PCI) segment may not be able to manage component(s) of a computer that are not connected to the PCI. Moreover, while the operating environment of a computer has visibility to most devices, it is transient in nature and not always available due to either service management reasons and/or system errors.

To manage a computer regardless of machine state and/or to obtain device inventory information, prior art computer management software traditionally interacts with two interfaces of the computer, namely, an in-band interface and an out-of-band interface. The two interfaces, and the management information they expose, are correlated by the management software, which may be a non-trivial task. From a prior art management software and/or client viewpoint, the in-band interface is a network card interface that is "owned" by the operating environment and set up to handle incoming management requests. Advantageously, the in-band interface of these prior art approaches can see and/or manage most resources of the computer. Disadvantageously, the in-band interface of these prior art approaches is transient. When the operating environment is inoperable (software and/or hardware failure) or out of service (system is rebooting or taken down), then the in-band interface of these prior art approaches is not accessible.

Further, from a prior art management software and/or client viewpoint, the out-of-band interface is an additional network card interface "owned" by an entity other than the operating environment such as a processor set up to handle incoming management requests. Advantageously, the out-of-band interface of these prior art approaches are available regardless of computer and/or operating environment state. Disadvantageously, the out-of-band interface of these prior art approaches have visibility to a subset, not the full set, of components in the computer.

In some prior art approaches, an operating environment and a management processor of a computer share information using register and/or memory-mapped input and output (IO) interfaces that are not native to the operating environment. To share such information an additional piece of software, sometimes called a "helper", "provider" or "agent", is written for the operating environment and installed by an administrator of the computer. In some instances, administrators prefer not to install such additional software. Further, such extra software has traditionally been customized for each operating environment and, thus, sometimes becomes obsolete or unstable over time as hardware and/or software changes occur.

Example management processors, methods and articles of manufacture that overcome the above problems are disclosed herein. Examples disclosed herein provide management processors which have visibility to the components in a computer (e.g., some or all components of the computer) using an operating system interface intended for management traffic. In some examples, the operating system interface is a network card interface to the operating environment implemented on and/or surfaced from a management processor such as an Integrity integrated Lights-out (iLO) processor sold by Hewlett-Packard®. In such examples, the network card interface enables the management processor and the operating environment of the computer to exchange management information. In particular, the network card interface surfaced by the management processor enables the operating environment to have visibility to management information of the management processor and/or enables the management processor to have visibility to management information in the operating environment.

In examples disclosed herein, in addition to the network card interface implemented by the operating system, a management client and/or software is communicatively coupled to an additional and/or externally accessible network card interface implemented by the management processor. Because the disclosed example management processors have visibility to other components of the computer, the management client and/or software may access this so-called out-of-band interface instead of accessing a network card interface (e.g., an in-band interface) implemented by the operating environment. As a result, the management processor becomes the default management interface for the computer regardless of computer state. Thus, unlike prior art systems, such example management client and/or software is not required to handle machine state changes and/or correlate management information obtained from multiple interfaces. Further, unlike prior art systems, such example management client and/or software no longer needs to correlate endpoint location information to determine whether two management endpoints refer to the same computer. Further still, it is not necessary for the management client and/or software to correlate management information between interfaces. Moreover, such example management client and/or software is not required to wait for a timeout of an in-band interface before communicating with the out-of-band interface. Even further, computer manufacturers are not required to provide custom software in order to enable these example management processors to communicate with the operating environment.

In examples disclosed herein, the management processor has full machine and state information whether or not the operating environment is available. In such examples, the management processor can use this information to affect policies that prior art management processors were unable to affect due to lack of information. Further, in such examples, the management processors can represent third-party IO devices with the driver provided by the manufacturer (e.g., with only that driver). In other words, no additional third party software is required.

Additionally or alternatively, example management processors disclosed herein can surface information and/or devices other than management information to the operating environment. Example information and/or devices that can be surfaced include, but are not limited to, a file transfer protocol (FTP) endpoint to enable a firmware update, an Internet small computer system interface (iSCSI) device to enable a software installation, boot device information (with read-only memory (ROM) support) for an iSCSI boot, an optical disc (e.g., a compact disc (CD) or a digital versatile disc (DVD)) storing a dynamic autoexec.inf file to begin a management process in the operating environment, a boot device intended for management, upgrades and/or run time, and/or "phone home" solutions to enable warranty and other information to be aggregated on the management network.

A disclosed example management processor includes a network card interface to communicatively couple the management processor to an operating environment, and a request processor to forward a received external management request to the operating environment via the network card interface, and to combine response information received from the operating environment with response information generated at the management processor A disclosed example method includes receiving an external management request via a port, determining at a management processor whether an operating environment is available, and when the operating environment is not available, generating a management response at the management processor from first management response information stored in a cache without passing the external management request to the operating environment.

A disclosed example tangible article of manufacture stores machine-readable instructions that, when executed, cause a machine to at least forward an external management request received at a management processor from an external requester to an operating environment via a network card interface, combine first response information received from the operating environment with second response information generated at the management processor, and export the combined first and second response information from the management processor to the external requester.

As used herein, the term "computer" refers to any of a personal computer, a workstation, a server, a blade server, a laptop computer, a tablet computer, a phone, and/or any other type of computing device containing one or more processors. Thus, even though the examples disclosed herein are described with reference to a computer, the examples may be implemented for any computing device containing a management processor. As used herein, the term "management processor" refers to a specialized controller or processor on the motherboard and/or an expansion module of a computer. A management processor will typically have limited memory, have limited processing capability, implement limited functionality, be non-user programmable, and/or implement highly optimized firmware. In some examples, the management processor manages the interface between management software and devices of the computer to which the management processor has visibility. As used herein, a management processor is different and distinct from other processors of the computer on which operating environment(s) of the computer are executed. In some examples, the management processor is implemented as part of a baseboard management controller.

Figure 1:
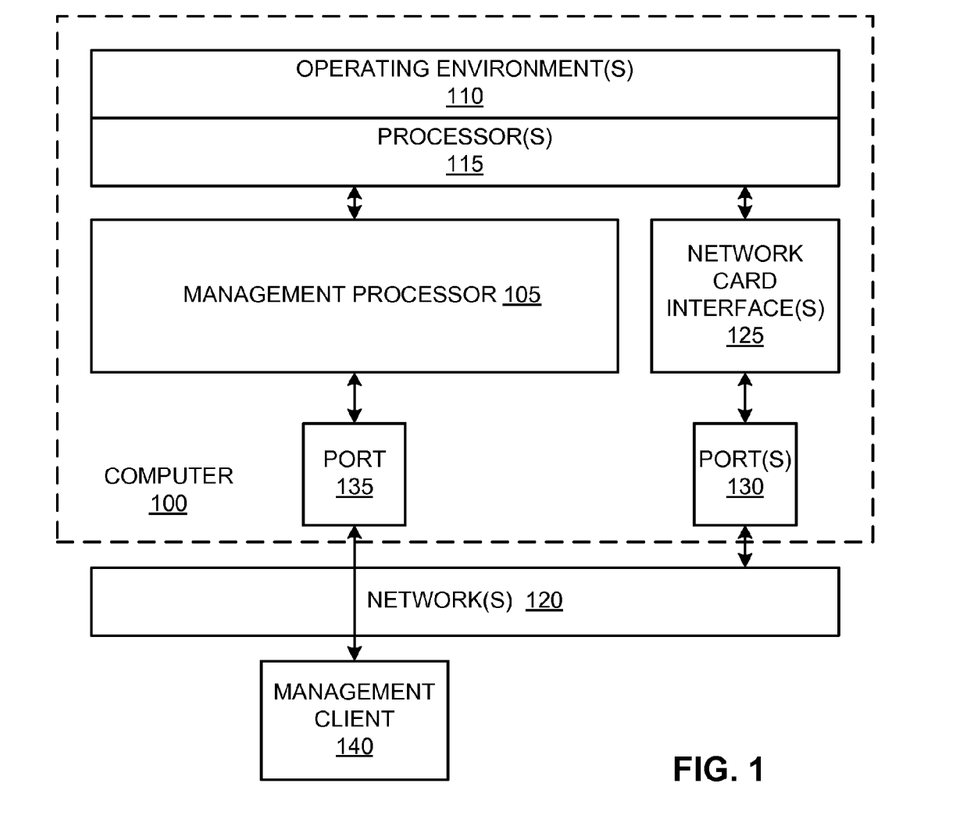
FIG. 1 is an example computer including a management processor constructed in accordance with the teachings of this disclosure.
Figure 2:
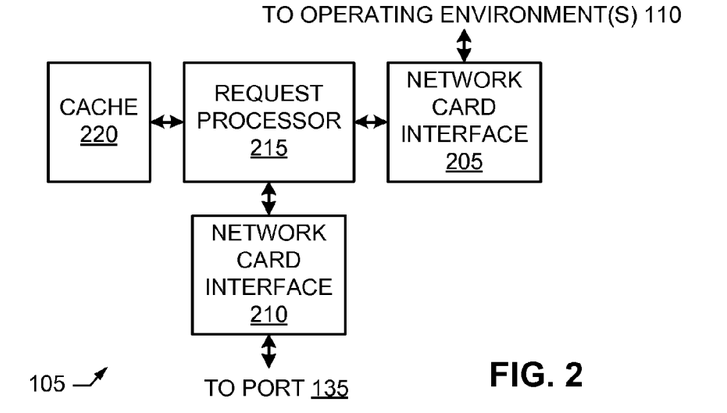
FIG. 2 illustrates an example manner of implementing the example management processor of FIG. 1.

FIG. 1 illustrates an example computer 100 having a management processor 105. FIG. 2 illustrates an example manner of implementing the example management processor 105 of FIG. 1. The example management processors 105 of FIGS. 1 and/or 2 provide, implement and/or surface a network card interface 205 to one or more operating environments 110 of the computer 100.

In the illustrated example of FIG. 1, the example operating environment(s) 110 are implemented on any number and/or type(s) of processor(s) 115. Example operating environments 110 include, but are not limited to, any number and/or type(s) of host operating system(s) and/or hypervisor(s).

To communicatively couple the example operating environment(s) 110 and/or the processors(s) 115 to other devices via any number and/or type(s) of private and/or public network(s) 120, the example computer 100 of FIG. 1 includes any number and/or type(s) of network card interface(s) 125 and port(s) 130. Example network card interfaces 125 include, but are not limited to, any number and/or type(s) of wired, wireless and/or optical network (e.g., Ethernet) interfaces. Example ports 130 include, but are not limited to, any number and/or type(s) of wired, wireless and/or optical network (e.g., Ethernet) ports. While not needed in the examples disclosed herein, one or more of the example network card interface(s) 125 may be used to provide an in-band communication path and/or interface between a management client and/or software 140 and the management processor 105.

To communicatively couple the example management processor 105 of FIGS. 1 and/or 2 to other devices such as a management client 140 via the network(s) 120, the management processor 105 of FIGS. 1 and/or 2 includes any type of network interface 210 (FIG. 2) and the example computer 100 of FIG. 1 includes any type of management port 135. The example network interface 210 of FIG. 2 is used to provide an out-of-band communication path and/or interface between a management client and/or software 140 and the management processor 105. The example network card interface 210 may, for example, be any kind of wired, wireless and/or optical network (e.g., Ethernet) interfaces. The example management port 135 may, for example, be any type of wired, wireless and/or optical network (e.g., Ethernet) port.

The example network card interface 205 of FIG. 2 is a network card interface that is natively and/or automatically supported by the example operating environment(s) 110 of FIG. 1 via, for example, plug-and-play discovery and/or configuration. Thus, the example operating environment(s) 110 do not require customized and/or manufacturer-provided drivers and/or support software in order to communicate with the example management processor 105 via the network card interface 205. In other words, the network card interface 205 may be used to replace driver(s) previously used by prior art operating environment(s) to communicate with a management processor. In some examples, the network card interface 205 is a virtual USB-based interface. The example network card interface 205 implemented and/or surfaced by the management processor 105 of FIGS. 1 and/or 2 enables the operating environment(s) 110 to have visibility to management and/or state information of the management processor 105, and enables the management processor 105 to have visibility to management and/or state information of the operating environment(s) 110.

In contrast to the example network card interface 205, the example network card interfaces 125 and 210 are physical network card interfaces, while the example network card interface 205 of FIG. 2 is a virtual network card interface surfaced, implemented and/or constructed by the management processor 105. However, even though the example network card interface 205 is virtualized, the operating environment(s) 110 interacts with the network card interface 205 as if the network card interface 205 were a physical network card interface.

In some examples, the operating environment(s) 110 are configured to first use, select and/or choose the network card interface(s) 125 when communicating (e.g., sending Ethernet packets) with other devices via the network(s) 120. While the example ports 130 and 135 are illustrated separately in FIG. 1, in some examples, the port 135 and one or more of the ports 130 may be implemented by a same physical port of the computer 100. In such examples, the network card interface(s) 125 and 210 are logically differentiated based on respective medium access control (MAC) addresses.

Because the example network card interface 205 of FIG. 2 enables the example operating environment(s) 110 and the example management processor 105 to communicate, exchange and/or share management and/or state information, the example management client 140 is able to communicate with the example management processor 105 via the example management port 135 to obtain any management and/or state information of interest. In other words, the example management processor 105 of FIGS. 1 and/or 2 is the default management interface for management and/or state information for the computer 100. The management client 140 of the illustrated example does not need to communicate with the operating environment(s) 110 via the port(s) 130 to request and/or obtain management and/or state information for the computer 100.

In some examples, the management processor 105 may be collocated with the network card interface 125. In some such examples, the network card interface 210 and the network card interface 125 may be implemented by the same network interface card. In such an example, the network card interface 210 may be addressed via the port 135 and the network card interface 125 may be addressed via the port 130. In such an example, the network card interfaces 125 and 205 for the operating environment 110 may be implemented by the same network card interface.

To handle management requests and responses, the example management processor 105 of FIGS. 1 and/or 2 includes a request processor 215. If an external management request is received from the management client 140 via the example port 135 when the operating environment(s) 110 are available, the example request processor 215 of FIG. 2 forwards and/or passes the external management request to the operating environment(s) 110 via the network card interface 205. When a corresponding management response is received from the operating environment(s) 110 via the network card interface 205, the example management processor 105 combines its own management response (if any) with the management response received from the operating environment(s) 110. The combined management response and/or management response information is passed to the management client 140 via the port 135. Because it is conceivable that the network card interface 205 can be the target of any network request, the example request processor 215 rejects any unintended and/or inapplicable requests (e.g., layer 2 and/or layer 4 requests). An example process that may be carried out to implement the example request processor 215 of FIG. 2 is described below in connection with FIG. 4.

To store management and/or state information, the example management processor 105 of FIG. 2 includes a cache 220. When management responses are received from the example operating environment(s) 110, the example request processor 215 stores the management and/or state information contained in the management responses in the example cache 220 for subsequent retrieval. If an external management request is received via the port 135 when the operating environment(s) 110 are not available, the example request processor 215 of FIG. 2 generates a management response based on the management and/or state information stored in the example cache 220. Thus, the management processor 105 enables the management client 140 to obtain management and/or state information for the computer 100, even when the operating environment(s) 110 are unavailable. Management and/or state information may be stored in the example cache 220 of FIG. 2 using any number and/or type(s) of data structure(s), list(s), table(s) and/or record(s). The example cache 220 may be implemented by any number and/or type(s) of volatile and/or non-volatile memory(-ies), memory device(s) and/or storage device(s).

In some examples, the example request processor 215 of FIG. 1 periodically and/or aperiodically generates and sends a management request to the operating environment(s) 110 via the network card interface 205 to obtain updated management and/or state information for the computer 100. Management and/or state information received in response to such requests are used to update the management and/or state information stored in the cache 220. In other words, the request processor 215 may send a management request to the operating environment(s) 110 to update a device inventory stored in the cache 220. Additionally or alternatively, the example request process 215 may send a management request to the operating environment(s) 110 to provide firmware and/or driver upgrades, and/or to synchronize information such as health state and/or status information.

When an internal management request is received from the operating environment(s) 110 via the network card interface 205, the example request processor 215 prevents and/or blocks the management request from being sent externally via the example port 135. In some examples, the management processor 105 responds to the internal management request with management and/or state information available to the management processor 105 (e.g., stored in the cache 220 and/or associated with devices managed by the management processor 105). Additionally or alternatively, the operating environment(s) 110 may use a traditional management processor interface such as keyboard controller style (KCS) to obtain management and/or state information from the example management processor 105.

While the example computer 100 and the example management processor 105 are illustrated in FIGS. 1 and 2, one or more of the interfaces, elements and/or devices illustrated in FIGS. 1 and 2 may be combined, divided, re-arranged, omitted, eliminated and/or implemented in any other way. Further, the example management processor 105, the example network card interface 205, the example operating environment(s) 110, the example processor(s) 115, the example network card interface(s) 125, the example port(s) 130, the example port 135, the example request processor 215, the example cache 220 and/or, more generally, the example computer 100 of FIGS. 1 and 2 may be implemented by the example process platform P100 of FIG. 4 and/or one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. When any apparatus claim of this patent incorporating one or more of these elements is read to cover a purely software and/or firmware implementation, at least one of the example management processor 105, the example network card interface 205, the example operating environment(s) 110, the example processor(s) 115, the example network card interface(s) 125, the example port(s) 130, the example port 135, the example request processor 215, the example cache 220 and/or, more generally, the example computer 100 is hereby expressly defined to include a tangible article of manufacture such as a tangible machine-readable medium storing machine-readable instructions such as the firmware and/or software. Further still, the example computer 100 may include interfaces, elements and/or devices instead of, or in addition to, those illustrated in FIGS. 1 and 2, and/or may include more than one of any or all of the illustrated interfaces, elements and/or devices.

Figure 3:
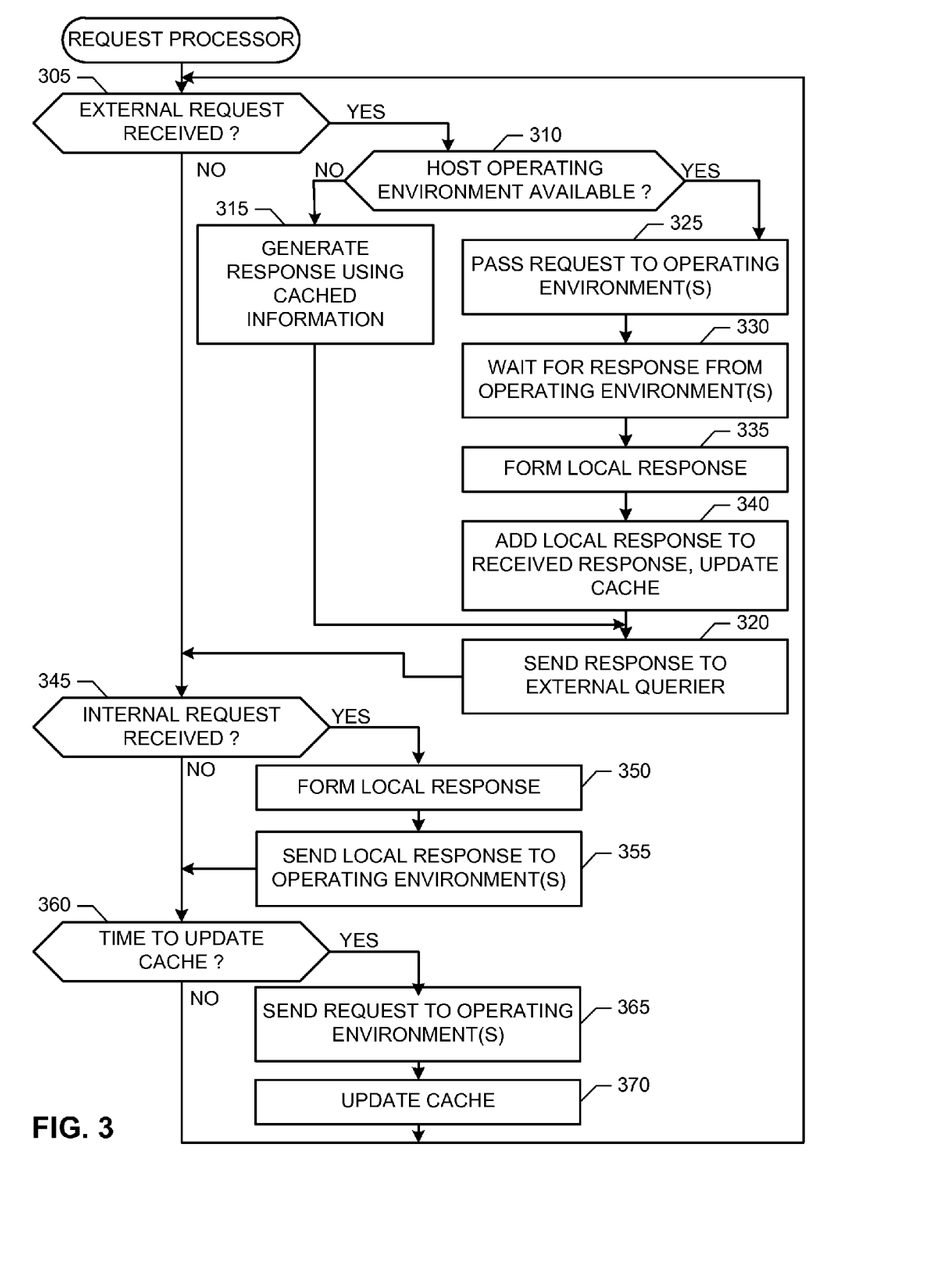
FIG. 3 is a flowchart illustrating an example process that may, for example, be implemented using machine-readable instructions executed by one or more processors to implement the example management processor of FIG. 1.

FIG. 3 is a flowchart of an example process that may, for example, be implemented as machine-readable instructions carried out by one or more processors to implement the example request processor 215 of FIG. 2. The example machine-readable instructions of FIG. 3 begin with the example request processor 215 determining whether an external management request was received via the port 135 (block 305). If an external management request was received (block 305), the request processor 215 determines whether the operating environment(s) (e.g., host operating systems) 110 are available (block 310).

If the operating environment(s) 110 are not available (block 310), the example request processor 215 forms and/or generates a management response based on management and/or state information stored in the example cache 220 (block 315). Alternatively, the request processor 215 may generate an operating environment response using the information stored in the cache 220, may generate a new local response as applicable, and may combine the generated operating environment (cached) response with the new local response. The example request processor 215 exports the management response to the external requester (e.g., the example management client 140) via the port 135 (block 320). Control then proceeds to block 345.

If the operating environment(s) 110 are available (block 310), the request processor 215 forwards the external management request to the operating environment(s) 110 via the network card interface 205 (block 325) and waits to receive a response (block 330). The operating environment(s) 110 are contacted when available in this manner to ensure the most recent management and/or state information is provided to the requesting entity. The request processor 215 generates a local management response as applicable (block 335) and adds the local management response (if any) to the management response received from the operating environment(s) 110 (block 340). The request processor 215 also updates the cache 220 based on the management and/or state information contained in the management response received from the operating environment(s) 110. The example request processor 215 then exports the management response to the external requester (e.g., the example management client 140) via externally via the port 135 (block 320). Alternatively, the request processor 215 may form and/or generate a management response based on management and/or state information stored in the example cache 220 when the operating environment(s) 110 are available. For example, the management and/or state information stored in the example cache 220 may be used to improve performance, may be used when it is known that information stored in the cache 220 is current, etc.

The request processor 215 determines whether an internal management request was received via the network card interface 205 (block 345). If an internal management request was received (e.g., from the operating environment(s) 110) (block 345), the request processor 215 generates a corresponding management response (block 350) and sends the management response to the requester (e.g., the operating environment(s) 110) via the network interface 205 (block 355). The request processor 215 of the illustrated example does not send the internal management request and/or the response thereto (e.g., also blocks and/or prevents the internal management request and/or the response thereto from being sent) externally via the port 135.

Periodically and/or aperiodically, the example request processor 215 of FIG. 2 may update the management and/or state information stored in the cache 220. When the cache 220 is to be updated (block 360), the request processor 215 sends a management request to the operating environment(s) 110 via the network interface 205 (block 365) and updates the cache 220 based on management and/or state information received from the operating environment(s) 110 via the network interface 205 (block 370). Control then returns to block 305.

A processor, a controller and/or any other suitable processing device may be used, configured and/or programmed to execute and/or carry out the example machine-readable instructions of FIG. 3. For example, the example process of FIG. 3 may be embodied in program code and/or machine-readable instructions stored on a tangible computer-readable medium accessible by a processor, a computer and/or other machine having a processor such as the example processor platform P100 of FIG. 4. Machine-readable instructions comprise, for example, instructions that cause a processor, a computer and/or a machine having a processor to perform one or more particular processes. Alternatively, some or all of the example machine-readable instructions of FIG. 3 may be implemented using any combination(s) of fuses, ASIC(s), PLD(s), FPLD(s), FPGA(s), discrete logic, hardware, firmware, etc. Also, some or all of the example machine-readable instructions of FIG. 3 may be implemented manually or as any combination of any of the foregoing techniques, for example, any combination of firmware, software, discrete logic and/or hardware. Further, many other methods of implementing the example process of FIG. 3 may be employed. For example, the order of execution may be changed, and/or one or more of the blocks and/or interactions described may be changed, eliminated, sub-divided, or combined. Additionally, any or all of the example machine-readable instructions of FIG. 3 may be carried out sequentially and/or carried out in parallel by, for example, separate processing threads, processors, devices, discrete logic, circuits, etc.

As used herein, the term "tangible computer-readable medium" is expressly defined to include any type of computer-readable medium and to expressly exclude propagating signals. As used herein, the term "non-transitory computer-readable medium" is expressly defined to include any type of computer-readable medium and to exclude propagating signals. Example tangible and/or non-transitory computer-readable medium include a volatile and/or non-volatile memory, a volatile and/or non-volatile memory device, a CD, a digital versatile disc (DVD), a floppy disk, a ROM, a random-access memory (RAM), a programmable ROM (PROM), an electronically-programmable ROM (EPROM), an electronically-erasable PROM (EEPROM), an optical storage disk, an optical storage device, magnetic storage disk, a network-attached storage device, a server-based storage device, a shared network storage device, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 4.

Figure 4:
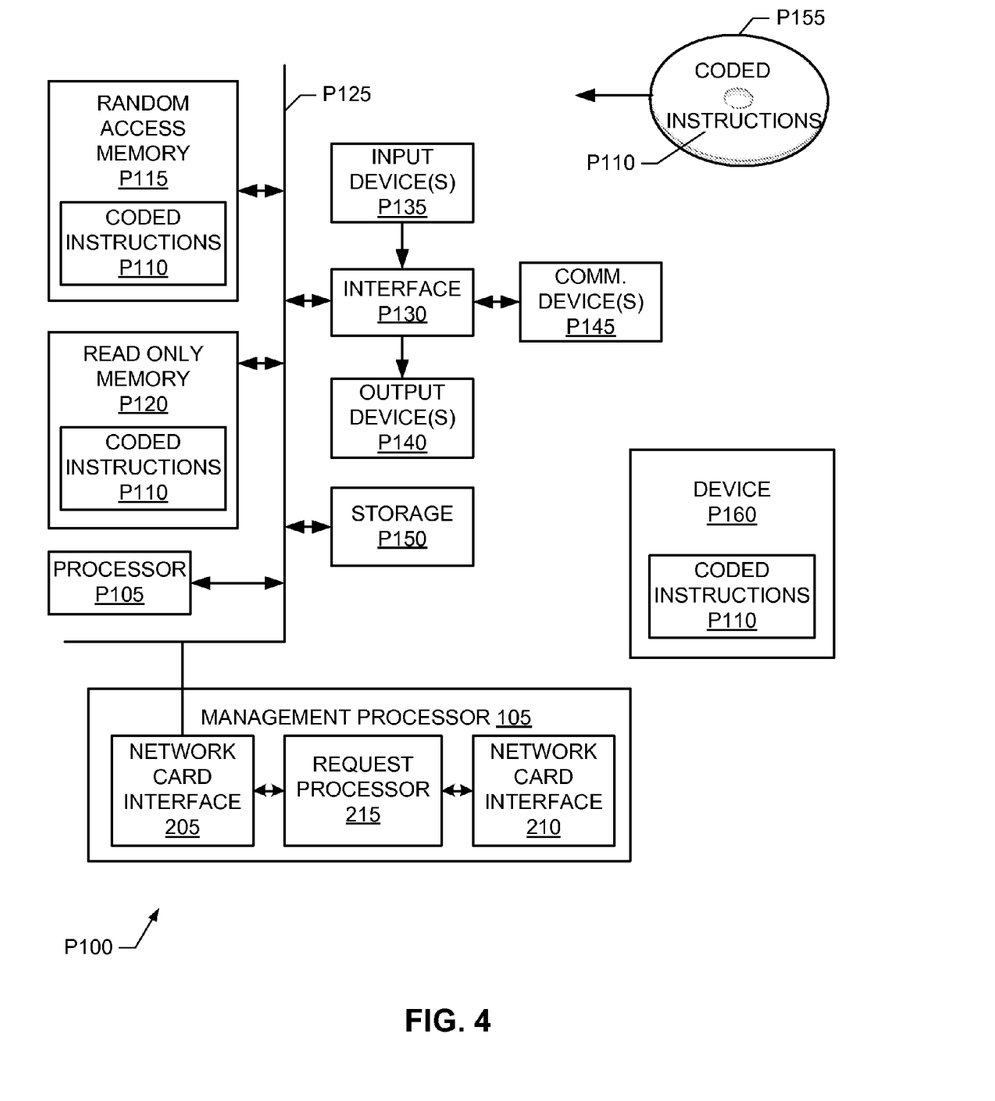
FIG. 4 is a schematic illustration of an example processor platform that may be used and/or programmed to implement the example computer of FIG. 1 and/or to execute the example machine-readable instructions of FIG. 3.

FIG. 4 illustrates an example processor platform P100 capable of executing the example instructions of FIG. 4 to implement the example management processor 105 and/or, more generally, to implement the example computer 100 of FIG. 1. The example processor platform P100 can be, for example, a microcontroller, a personal computer, a workstation, a server, and/or any other type of computing device containing a processor.

The processor platform P100 of the instant example includes at least one programmable processor P105. For example, the processor P105 can be implemented by one or more Intel®, AMD®, and/or ARM® microprocessors. Of course, other processors from other processor families and/or manufacturers are also appropriate. The processor P105 executes coded instructions P110 present in main memory of the processor P105 (e.g., within a volatile memory P115 and/or a non-volatile memory P120), stored on a storage device P150, stored on a removable computer-readable storage medium P155 such as a CD, a DVD, a floppy disk and/or a FLASH drive, and/or stored on a communicatively coupled device P160 such as an external floppy disk drive, an external hard disk drive, an external solid-state hard disk drive, an external CD drive, an external DVD drive a server, a network-attached storage device, a server-based storage device, and/or a shared network storage device. The processor P105 may execute, among other things, the example machine-readable instructions of FIG. 3. Thus, the coded instructions P110 may include the example instructions of FIG. 3.

In some examples, one or more of the storage devices P150, the removable storage medium P155 and/or the device P160 contains, includes and/or stores an installation package and/or program including the machine-readable instructions of FIG. 3 and/or the coded instructions P110.

The processor P105 is in communication with the main memory including the non-volatile memory P120 and the volatile memory P115, and the storage device P150 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of RAM device(s). The non-volatile memory P120 may be implemented by flash memory(-ies), flash memory device(s) and/or any other desired type of memory device(s). Access to the memory P115 and P120 may be controlled by a memory controller. The example volatile memory P115 may be used to store the example cache 220 of FIG. 2.

When the example processor platform P100 is used to implement the example computer 100 of FIG. 1, the example processor platform P100 includes the example management processor 105 of FIGS. 1 and 2, as shown in FIG. 4. In such examples, the network card interface 205 communicatively couples the request processor 215 to the example processor(s) P105 implementing the example operating environment(s) 110 of FIG. 1, and the example network card interface 210 provides and/or implements an out-of-band communication interface coupling the management processor 105 to the management client and/or software 140

The processor platform P100 also includes an interface circuit P130. Any type of interface standard, such as an external memory interface, serial port, general-purpose input/output, as an Ethernet interface, a universal serial bus (USB), and/or a PCI express interface, etc, may implement the interface circuit P130.

One or more input devices P135 are connected to the interface circuit P130. The input device(s) P135 permit a user to enter data and commands into the processor P105. The input device(s) P135 can be implemented by, for example, a keyboard, a mouse, a touchscreen, a track-pad, a trackball, isopoint and/or a voice recognition system.

One or more output devices P140 are also connected to the interface circuit P130. The output devices P140 can be implemented, for example, by display devices (e.g., a liquid crystal display, a cathode ray tube display (CRT), a printer and/or speakers). The interface circuit P130, thus, typically includes a graphics driver card.

The interface circuit P130 may also includes one or more communication device(s) P145 such as a network interface card (e.g., one of the example network card interfaces 125 of FIG. 1) to facilitate exchange of data with other computers, nodes and/or routers of a network.

In some examples, the processor platform P100 also includes one or more mass storage devices P150 to store software and/or data. Examples of such storage devices P150 include a floppy disk drive, a hard disk drive, a solid-state hard disk drive, a CD drive, a DVD drive and/or any other solid-state, magnetic and/or optical storage device. The example storage devices P150 may be used to, for example, store the example instructions of FIG. 3 and/or the example cache 220 of FIG. 2.

The device P160 may, for example, be communicatively coupled to the processor platform P100 via the communication devices P140 and/or the interface P130.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:

1. A method comprising:
in response to receiving, at a management processor, an internal management request from an operating environment via a network card interface, generating, at the management processor, a management response using management information stored in a cache of the management processor, the management information associated with an external device managed by the management processor via a port, the internal management request being a request to generate and send the management response to the operating environment;
sending the management response to the operating environment via the network card interface without exporting the internal management request via the port;
when the operating environment is available, forwarding an external management request from the management processor to the operating environment via the network card interface;
generating at the management processor, second external management response information in response to the external management request; and
combining, at the management processor, third external management response information received from the operating environment via the network card interface with the second external management response information.

2. A method according to claim 1, further comprising:
in response to the external management request received via the port, determining at the management processor whether the operating environment is available; and
when the operating environment is not available, generating an external management response at the management processor from first external management response information stored in the cache without passing the external management request to the operating environment.

3. A method as defined in claim 1, further comprising exporting the combined second and third external management information via the port.

4. A method as defined in claim 1, further comprising:
sending a second internal management request to the operating environment via the network card interface; and
updating the cache based on second management response information received from the operating environment via the network card interface.

5. A method as defined in claim 1, wherein, the internal management request from the operating environment includes a request for status information for devices managed by the management processor.

6. A method comprising:
in response to receiving, at a management processor, an internal management request from an operating environment via a network card interface, generating, at the management processor, a management response using management information stored in a cache of the management processor, the management information associated with an external device managed by the management processor via a port, the internal management request being a request to generate and send the management response to the operating environment;
sending the management response to the operating environment via the network card interface without exporting the internal management request via the port;
in response to receiving an external management request when the operating environment is available, generating a second management response at the management processor from second management response information stored in the cache without passing the external management request to the operating environment;
generating at the management processor, second management response information in response to the external management request; and
combining at the management processor, third management response information received from the operating environment via the network card interface with the second management response information.

7. A management processor comprising:
a network card interface to communicatively couple the management processor to an operating environment;
a cache to store management information associated with an external device, the external device managed by the management processor via a port; and
a request processor to:
process an internal management request from the operating environment, the internal management request being a request to generate and send a management response to the operating environment,
generate the management response using the management information without exporting the internal management request via the port, and
send the management response to the operating environment,
wherein the request processor is to forward a received external management request to the operating environment via the network card interface, and to combine response information received from the operating environment with response information generated at the management processor.

8. A management processor as defined in claim 7, wherein the request processor is to export the combined response information to a sender of the external management request.

9. A management processor as defined in claim 7, wherein the cache is further to store management response information received from the operating environment, wherein the request processor is to:
determine whether the operating environment is available; and
when the operating environment is not available, generate the response information at the management processor from the management response information stored in the cache without passing the external management request to the operating environment.

10. A management processor as defined in claim 7, wherein the request processor is to:
send a second internal management request to the operating environment via the network card interface; and
update the cache based on a second management response received from the operating environment.

11. A management processor as defined in claim 7, wherein the internal management request from the operating environment includes a request for status information for devices managed by the management processor.

12. A management processor as defined in claim 7, wherein the network card interface comprises a virtualized network card interface.

13. A tangible computer readable storage disc or storage device comprising computer readable instructions that when executed, cause a processor to at least:
generate a management response using management information associated with an external device managed by the processor via a port, the management information stored in a cache of the processor, and the management response being generated in response to an internal management request received at the processor from an operating environment via a network card interface without exporting the internal management request via the port, the internal management request being a request to generate and send the management response to the operating environment;
send the management response to the operating environment via the network card interface;
forward an external management request received at the processor from an external requester to an operating environment via a network card interface;
combine first response information received from the operating environment with second response information generated at the processor; and
export the combined first and second response information from the processor to the external requester.

14. A tangible computer readable storage disc or storage device comprising computer readable instructions that when executed, cause a processor to at least:
generate a management response using management information associated with an external device managed by the processor via a port, the management information stored in a cache of the processor, wherein the management response is generated in response to an internal management request received at the processor from an operating environment via a network card interface without exporting the internal management request via the port, the internal management request being a request to generate and send the management response to the operating environment;
send the management response to the operating environment via the network card interface;

determine whether the operating environment is available;

when the operating environment is not available, obtain third management response information from the cache without passing an external management request to the operating environment; and export the combined third and second response information from the processor to the external requester.

15. A tangible computer readable storage disc or storage device as defined in claim 14, wherein the computer readable instructions, when executed, cause the processor to at least:

send a second internal management request to the operating environment via the network card interface; and update the cache based on fourth management response information received from the operating environment.

* * * * *